United States Patent [19]

Hayashi et al.

[11] Patent Number: 4,745,406
[45] Date of Patent: May 17, 1988

[54] LIQUID CRYSTAL DISPLAY APPARATUS

[75] Inventors: Yuji Hayashi; Mitsuo Soneda, both of Shinagawa, Japan

[73] Assignee: Sony Corporation, Tokyo, Japan

[21] Appl. No.: 859,626

[22] PCT Filed: Aug. 22, 1985

[86] PCT No.: PCT/JP85/00463

§ 371 Date: Apr. 22, 1986

§ 102(e) Date: Apr. 22, 1986

[87] PCT Pub. No.: WO86/01624

PCT Pub. Date: Mar. 13, 1986

[30] Foreign Application Priority Data

Aug. 23, 1984 [JP] Japan ................. 59-175703
Aug. 30, 1984 [JP] Japan ................. 59-180935

[51] Int. Cl.$^4$ ................. G02F 1/133; G02F 1/23
[52] U.S. Cl. ................. 340/784; 340/703; 350/335; 350/341
[58] Field of Search ................. 340/784, 703; 350/334, 350/335, 341

[56] References Cited

U.S. PATENT DOCUMENTS 4,600,274 3/1983 Morozumi ................. 340/784

FOREIGN PATENT DOCUMENTS 56-91275 7/1981 Japan.
58-172085 10/1983 Japan.
59-9636 1/1984 Japan.

*Primary Examiner*—Howard A. Birmiel
*Attorney, Agent, or Firm*—Hill, Van Santen, Steadman & Simpson

[57] ABSTRACT

The present invention is, in a liquid crystal display apparatus, to increase a resolution by disposing every other one of picture element electrodes ($P_{11}$ to $P_{nm}$) with a displacement of ½ picture element pitch and also to obtain an excellent quality of picture by providing color filters (R, G, B) in association with these picture element electrodes.

1 Claim, 8 Drawing Sheets

FIG. 9

| Field | | Gate Line(G) Upon Selection | Switching Element(M) Upon Selection | Switch (13R) | Switch (13G) | Switch (13B) | Change-over Switch (12) |
|---|---|---|---|---|---|---|---|
| One | t | S S+2 | | ON | OFF | OFF | B |
| | | S+1 S+3 | | OFF | OFF | ON | B |
| | t+1 | S S+2 | | OFF | ON | OFF | B |
| | | S+1 S+3 | | ON | OFF | OFF | B |
| | t+2 | S S+2 | | OFF | OFF | ON | B |
| | | S+1 S+3 | | OFF | ON | OFF | B |
| The Other | t | S S+2 | | OFF | ON | OFF | A |
| | | S+1 S+3 | | OFF | OFF | ON | B |
| | t+1 | S S+2 | | OFF | OFF | ON | A |
| | | S+1 S+3 | | ON | OFF | OFF | B |
| | t+2 | S S+2 | | ON | OFF | OFF | A |
| | | S+1 S+3 | | OFF | ON | OFF | B |

FIG. 10

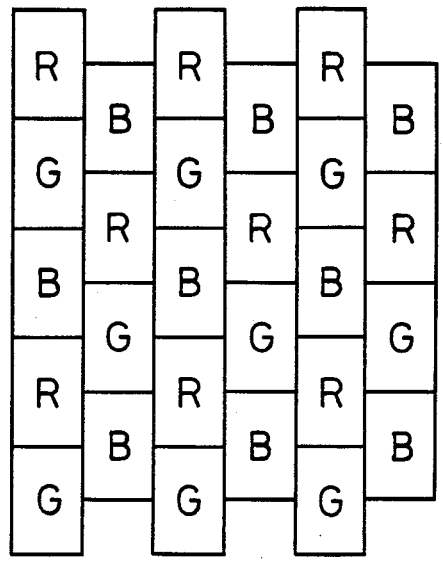

R Represents Red Color Filter

G Represents Green Color Filter

B Represents Blue Color Filter

LIQUID CRYSTAL DISPLAY APPARATUS

TECHNICAL FIELD

The present invention relates to a liquid crystal display apparatus used, for example, to receive a television picture.

BACKGROUND ART

It is proposed to display a television picture by using, for example, a liquid crystal.

In FIG. 11, reference numeral 1 designates an input terminal to which a television video signal is supplied. The signal from this input terminal 1 is supplied through switching elements $M_1, M_2, \ldots M_m$, each of which is formed of, for example, an N-channel FET, to lines $L_1$, $L_2, \ldots L_m$ in the vertical (Y axis) direction where m is the number corresponding to the number of the picture elements in the horizontal (X axis) direction. Further, there is provided a shift register 2 having m stages. This shift register 2 is supplied with clock signals $\phi_{1H}$, $\phi_{2H}$ each having a frequency m times the horizontal frequency. Drive pulse signals $\phi_{H1}, \phi_{H2}, \ldots \phi_{Hm}$, which are derived from the respective output terminals of this shift register 2 and sequentially scanned by the clock signals $\phi_{1H}$, $\phi_{2H}$, are supplied to the respective control terminals of the switching elements $M_1$ to $M_m$. To the shift register 2, there are supplied a low potential ($V_{SS}$) and a high potential ($V_{DD}$) and thereby drive pulses of two potentials are generated.

To the respective lines $L_1$ to $L_m$, there are connected one ends of switching elements $M_{11}, M_{21}, \ldots M_{nl}, M_{12}, M_{22}, \ldots M_{n2}, \ldots M_{lm}, M_{2m}, \ldots M_{nm}$, which are each formed of, for example, an N-channel FET, where n is the number corresponding to the number of the horizontal scanning lines. The other ends of these switching elements $M_{11}$ to $M_{nm}$ are respectively connected through liquid crystal cells $C_{11}, C_{21}, \ldots C_{nm}$ to a target terminal 3.

Further, there is provided a shift register 4 having n stages. This shift register 4 is supplied with clock signals $\phi_{1V}$ and $\phi_{2V}$ each having a horizontal frequency. Drive pulse signals $\phi_{V1}, \phi_{V2}, \ldots \phi_{Vn}$, which are derived from the respective output terminals of this shift register 4 and sequentially scanned by the clock signals $\phi_{1V}$ and $\phi_{2V}$, are supplied through gate lines $G_1, G_2, \ldots G_n$ in the horizontal (X axis) directions to control terminals of the switching elements $M_{11}$ to $M_{nm}$ at every rows ($M_{11}$ to $M_{1m}$), ($M_{21}$ to $M_{2m}$), $\ldots$ ($M_{n1}$ to $M_{nm}$) in the X axis direction, respectively. Also, the shift register 4 is supplied with the potentials $V_{SS}$ and $V_{DD}$ similarly to the shift register 2.

That is, in this circuit, to the shift registers 2 and 4, there are supplied the clock signals $\phi_{1H}, \phi_{2H}, \phi_{1V}$ and $\phi_{2V}$ which are shown in FIGS. 12A and 12B. Then, the shift register 2 generates signals $\phi_{H1}$ to $\phi_{Hm}$ at every picture element periods as shown in FIG. 12C, while the shift register 4 generates signals $\phi_{V1}$ to $\phi_{Vn}$ at every one horizontal period as shown in FIG. 12D. Further, to the input terminal 1, there is supplied a signal as shown in FIG. 12E.

When the signals $\phi_{V1}$ and $\phi_{H1}$ are generated, the switching elements $M_1$ and $M_{11}$ to $M_{1m}$ are turned on and thereby a current path from the input terminal 1 through $M_1, L_1, M_{11}, C_{11}$ to the target terminal 3 is formed, through which a potential difference between the signal supplied to the input terminal 1 and the signal at the target terminal 3 is supplied to the liquid crystal cell $C_11$. As a result, in the capacity portion of the cell $C_{11}$, there is sampled and then held a charge corresponding to a potential difference made by the signal of a first picture element. The optical transmissivity of the liquid crystal is changed in response to this charge amount. The similar operation is sequentially carried out on the following cells $C_{12}$ to $C_{nm}$. Further, when the signal of the next field is supplied, the charge amounts of the respective cells $C_{11}$ to $C_{nm}$ are re-written.

As described above, the optical transmissivities of the liquid crystal cells $C_{11}$ to $C_{nm}$ are changed in response to the respective picture elements of the video signal, and this operation is sequentially repeated to thereby display a television picture.

By the way, when the display is made by the liquid crystal, an AC drive system is generally adopted so as to improve its reliability and its service life. For example, in the display of a television picture, a signal, which results from inverting a video signal at every one field or at every one frame, is supplied to the input terminal 1. In other words, to the input terminal 1, there is supplied a signal which is inverted at every one field or at every one frame as shown in FIG. 12E.

By the way, in the above mentioned apparatus, picture element electrodes P of the respective liquid crystal cells C are aligned in the vertical and horizontal directions as shown by broken lines in the figure. On the other hand, when the television picture is displayed, in order to miniaturize the circuit scale, two pictures provided by a so-called interlace are displayed on the same display section. For this reason, the prior art apparatus has a problem that the vertical resolution is lowered.

That is, as shown, for example, in FIG. 13A, when a black color is displayed on an n-th scanning line of a first interlaced field and on an n+264th scanning line of a second interlaced field and a white picture is displayed on other scanning lines, if they are displayed on the same display section, the black and white pictures are alternately displayed on adjacent two display sections as shown in FIG. 13B. One square in the figure represents one liquid crystal cell, a character on the upper side thereof represents the display of black color (B) and white color (W) on the first field and a character on the lower side thereof represents those displayed on the second field. As will be clear from this figure, when the above mentioned picture is displayed, the display is made such that one grey line having a double width is displayed on the whole and thus the vertical resolution is lowered.

Further in the afore-mentioned apparatus, if color filters having different colors are disposed at every liquid crystal cells C and the video signals applied to the input terminal 1 are made as corresponding color signals, it is possible to make the color display. In that case, the picture element electrodes P of the respective liquid crystal cells C are respectively aligned in the vertical and horizontal directions as shown by broken lines in the figure.

Accordingly, as a method for disposing the color filters relative to the aligned picture elements (electrodes P), there is frequently employed a color filter of a so-called stripe type as shown in FIG. 14. In the figure, reference letter R represents a red color filter, G a green color filter and B represents a blue color filter.

However, in the case of such stripe-type color filter, the resolution in the horizontal direction is lowered to ⅓ as compared with a monochromatic type so that the quality of a picture is deteriotated considerably.

While, a color filter of a so-called mosaic type is proposed as shown in FIG. 15, in this case, although the horizontal resolution is improved as compared with the stripe-type color filter, as will be clear from the figure, the color filters having the same color are disposed obliquely so that slant color lines like a beat interference appear in the picture, thus the quality of the picture being deteriorated considerably.

DISCLOSURE OF INVENTION

In view of the above mentioned problems, this invention is made. According to this apparatus, since the displacement of ½ picture element pitch amount is provided, it is possible to increase the vertical resolution and also to improve the quality of a picture.

BRIEF DESCRIPTION OF DRAWINGS

FIGS. 9 and 10 are diagrams useful for the explanation thereof and FIGS. 11 to 15 are diagrams used to explain a prior art technology.

BEST MODE FOR CARRYING OUT THE INVENTION

Figure 1:
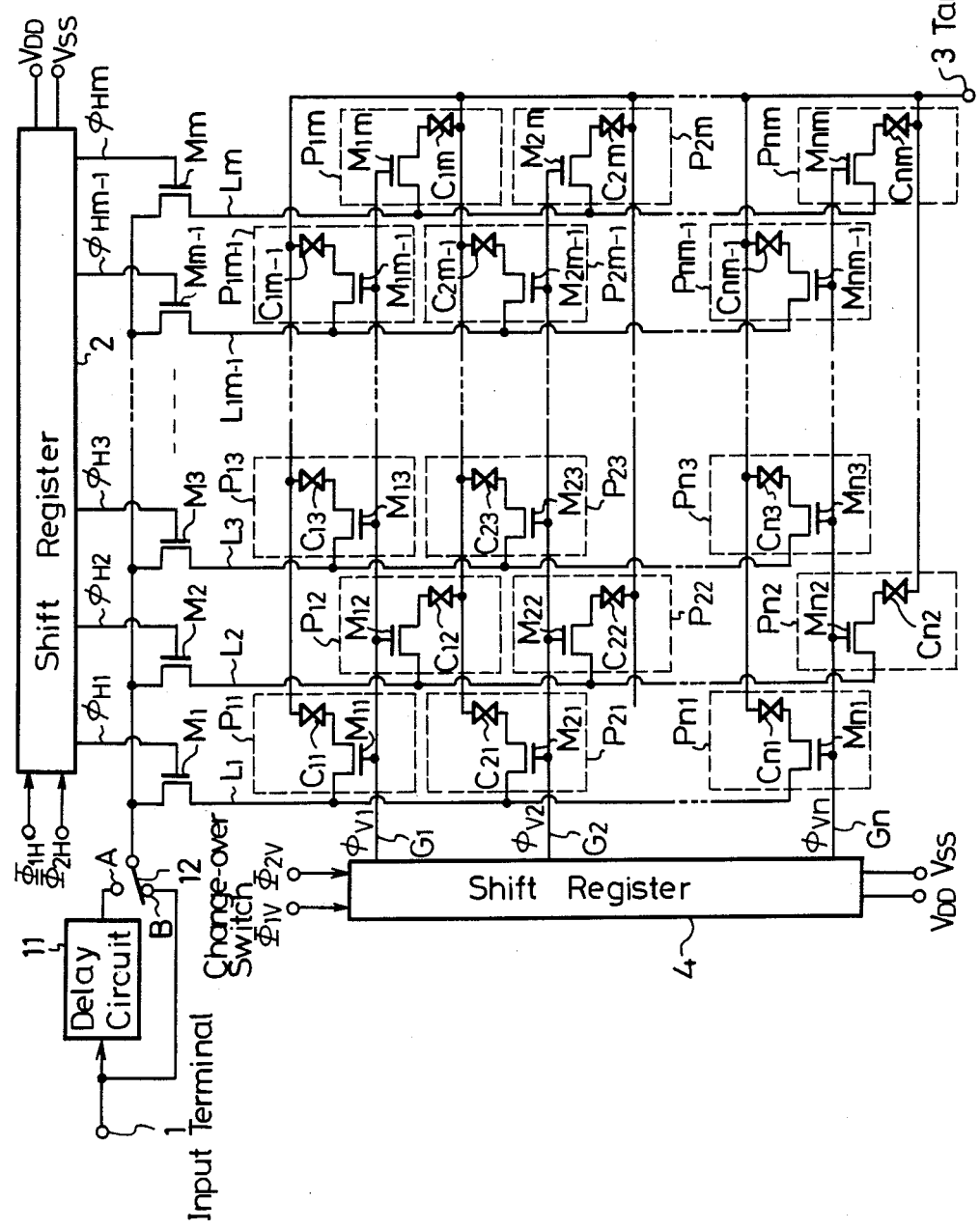
FIG. 1 a constructional diagram of a liquid crystal apparatus according to the present invention.

In FIG. 1, for example, switching elements $M_{11}$, $M_{12}$, ... $M_{nm}$ are provided with their directions reversed at every other one and respective picture element electrodes $P_{11}$, $P_{12}$, ... $P_{nm}$ are each located with a displacement of ½ picture element pitch amount.

Further, a video signal from an input terminal 1 is supplied to a one horizontal period delay circuit 11. The signal from this delay circuit 11 is supplied to one fixed contact A of a change-over switch 12 and an original video signal from the input terminal 1 is supplied to the other fixed contact B of the change-over switch 12. The signal from this change-over switch 12 is supplied to the switching elements $M_1$ to $M_m$.

In this apparatus, during one field of the interlace, the change-over switch 12 is connected to the fixed contact B thereof, while during the other field, it is alternately changed-over to the fixed contacts A and B in response to the clock signals $\phi_{1H}$ and $\phi_{2H}$.

Figure 2:
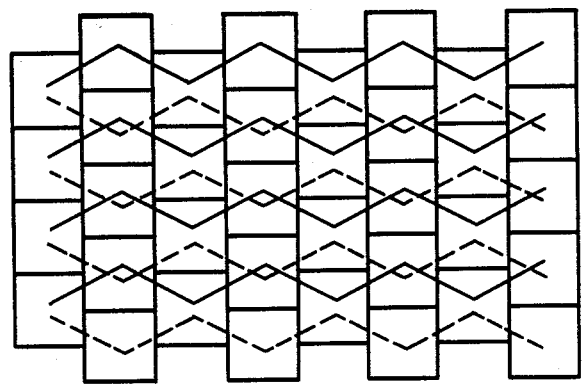
FIGS. 2 to 4 are diagrams used to explain the operation thereof.
Figure 3:
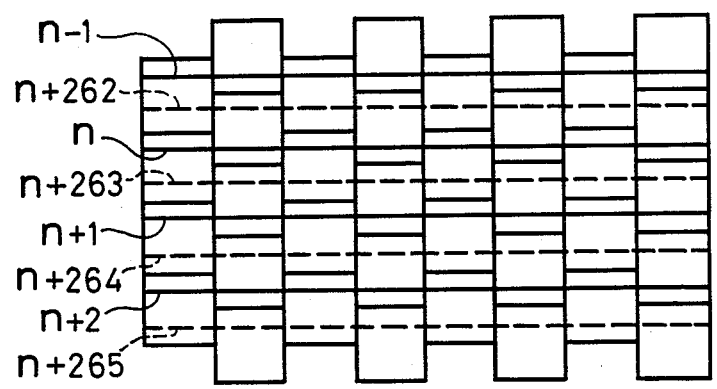

Thus, the horizontal scanning lines constituting the picture are sequentially displayed by the picture element electrodes connected to the same gate line during one field. They are displayed as, for example, shown by a solid line in FIG. 2. On the other hand, during the other field, the switch 12 is changed-over at every one clock period, whereby the signal delayed by one horizontal period in the delay circuit 11 is supplied to the picture element electrodes which are displaced upward relative to the gate line. In other words, the signal which constructs the same horizontal scanning line is displayed by the next horizontal scanning line at every other one picture element electrode. Accordingly, during the other field, the horizontal scanning line is displayed at every other one picture element electrode by the picture element electrode displaced downward and thus it is displayed as shown by broken lines in FIG. 2. In this case, the apparent scanning line is located at the averaged position thereamong so that as shown in FIG. 3, the scanning lines of one and another fields are separated and hence the vertical resolution is improved.

Figure 4:
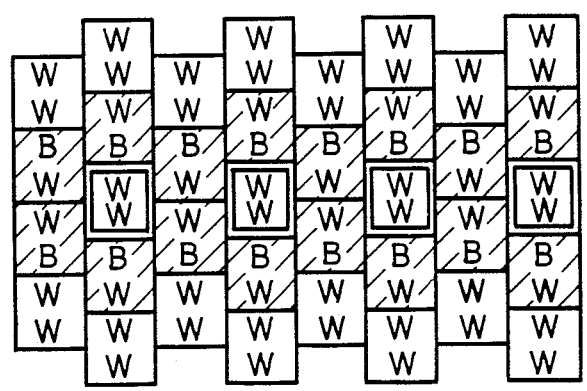
Figures 13A, 13B, 14, 15:
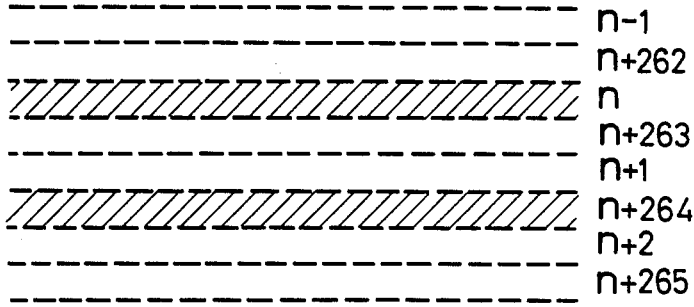

In other words, for example, when the afore-mentioned picture shown in FIG. 13A is displayed, scanning lines $n-1$, $n$, $n+1$ and $n+2$ in one field are displayed as shown by solid lines, while scanning lines $n+262$, $n+263$, $n+264$ and $n+265$ of the other field are displayed as shown by broken lines. Thus, the display thereof becomes as shown in FIG. 4. In this display, by a picture element electrode located between black (B) lines displayed and shown by a double line, white color (W) is displayed during both one and the other fields. When the display of the white color (W) is formed between the black lines with the result that the black line is separated to two lines, thus the vertical resolution being increased.

The picture display is carried out as described above. According to the above mentioned apparatus, since the displacement of ½ picture element pitch amount is provided, the vertical resolution could be increased as compared with the prior art apparatus.

Figure 5:
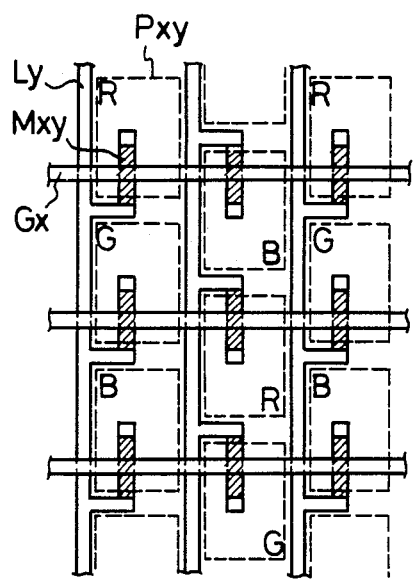
FIGS. 5 to 7 are diagrams showing a practical arrangement of an element.

Further, FIG. 5 shows a practical arrangement of an element. In the figure, an elongated portion of a line L is connected to one end of a switching element M shown by hatchings, the other end of this element M is connected to a picture element electrode P and a gate line G is provided at the center of the element M. As described above, the positions of the picture element electrodes $P_{11}$, $P_{12}$, ... $P_{nm}$ can be each displaced from each other by ½ picture element pitch amount.

Figure 6:
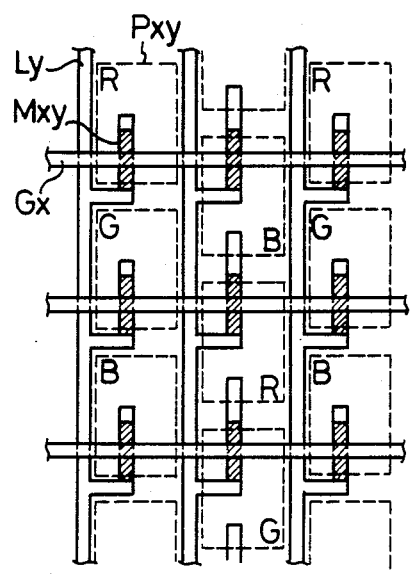
Figure 7:
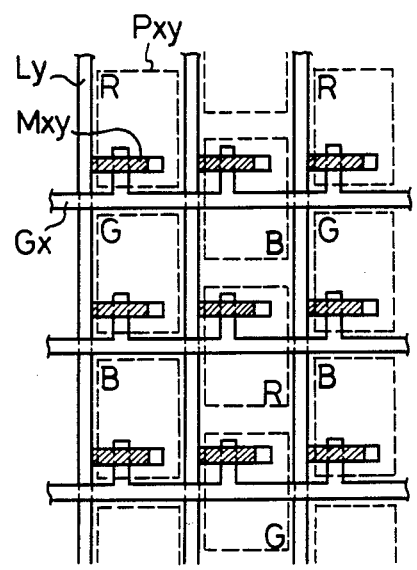

Furthermore, FIGS. 6 and 7 illustrate other practical examples of location of the element. In both of these examples, the construction of the switching elements $M_{11}$, $M_{12}$, ... $M_{nm}$ is made the same but by skillfully connecting the switching elements with the respective picture element electrodes P11, $P_{12}$, ... $P_{nm}$, the positions of the picture element electrodes $P_{11}$, $P_{12}$, ... $P_{nm}$ are displaced from each other by ½ picture element pitch amount.

Figure 8:
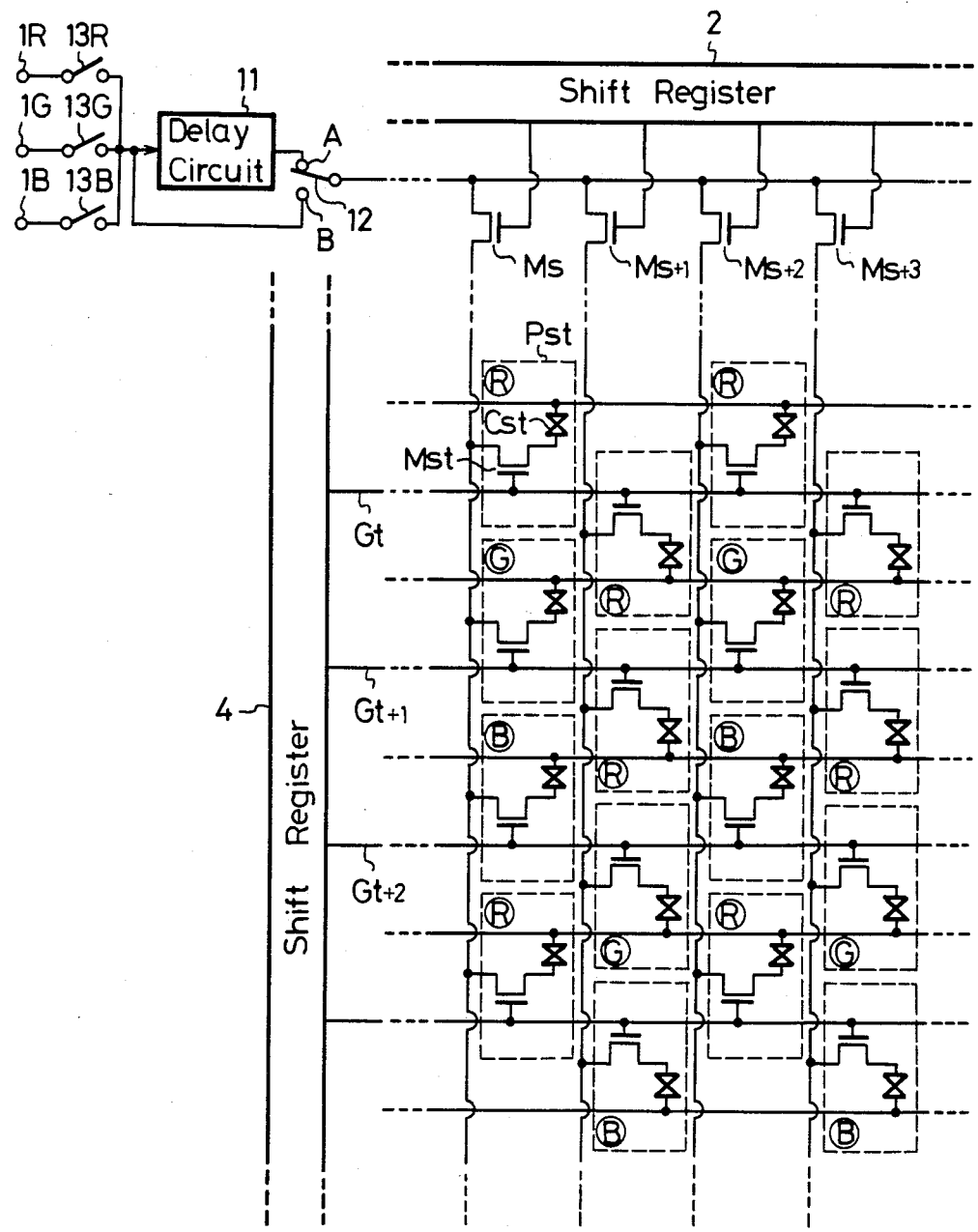
FIG. 8 is a constructional, diagram used when a color display is carried out.
Figure 11:
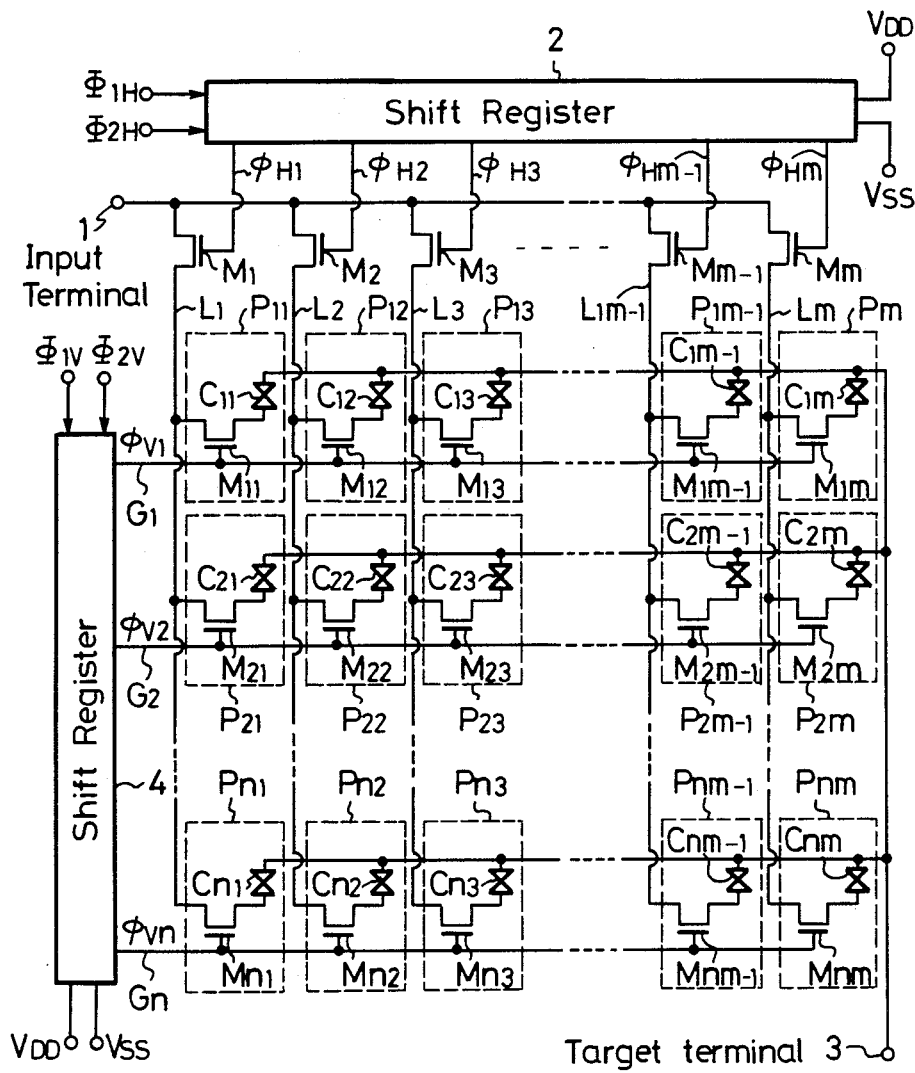
Figure 12A:
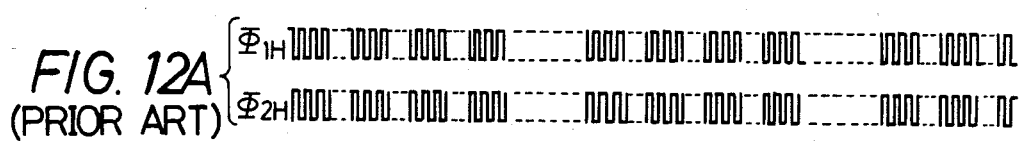
Figure 12B:
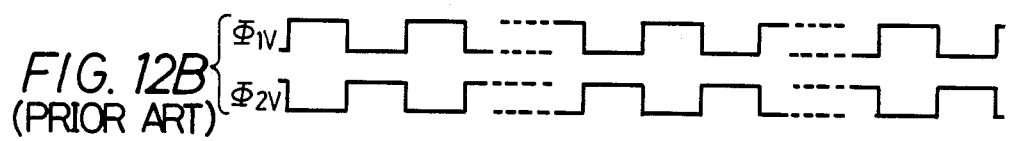
Figure 12C:
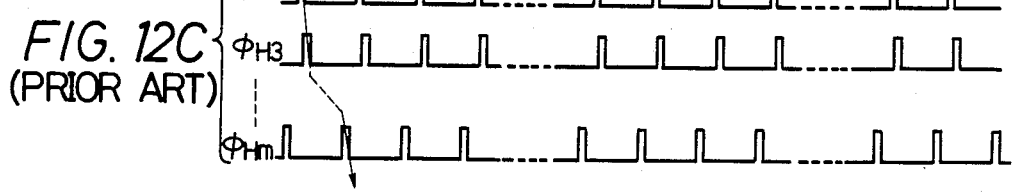
Figure 12D:
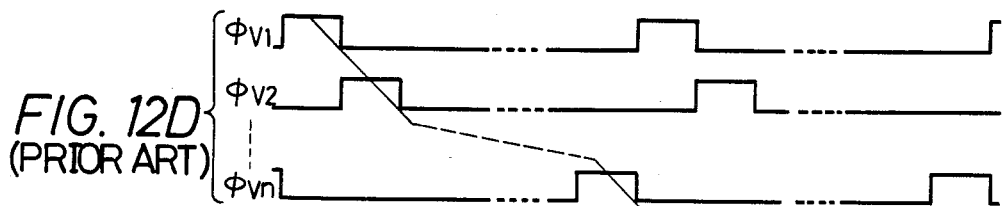
Figure 12E:
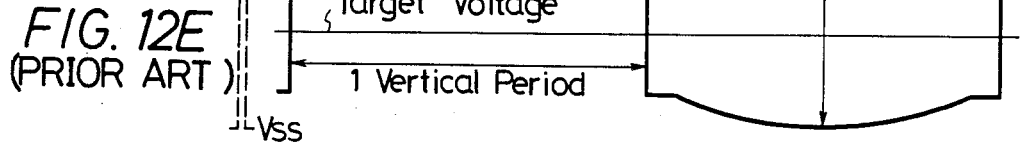

In addition, FIG. 8 shows a case in which the color display is carried out. In that case, red (R), green (G) and blue (B) color filters are located as shown in the figure. Then, the respective color signals are applied to input terminals 1R, 1G and 1B. These signals are selected by switches 13R, 13G and 13B and then supplied to the delay circuit 11 and to the change-over switch 12.

In this apparatus, as, for example, shown in FIG. 9, in one field, during a period in which a gate line $G_t$, for example, is selected, the switches 13R and 13B are alternately turned on for the alternate picture element electrodes; during a period in which the next gate line $G_{t+1}$ for example, is selected, the switches 13G and 13R are alternately turned on; and during a period in which a gate line $G_{t+2}$ is selected, the switches 13B and 13G are alternately turned on and the change-over switch 12 is connected to the fixed contact B, whereby the color signals corresponding to the color filters are supplied to the respective picture element electrodes. While, in the other field, during the period in which the gate line $G_t$ is selected, the switches 13G and 13B are alternately turned on; during the period in which the gate line $G_{t+1}$ is selected, the switches 13B and 13R are alternately turned on; and during the period in which the gate line $G_{t+2}$ is selected, the switches 13R and 13G are alternately turned on and the change-over switch 12 is changed-over to the contacts A and B at every clock periods, whereby the color signals corresponding to the color filters are supplied to the respective picture element electrodes.

Thus, the color signals corresponding to the color filters are displayed by the respective picture element electrodes and the color picture can be displayed.

Accordingly, in this example, the arrangement of the color filters becomes as shown in FIG. 10. According to this arrangement, the horizontal resolution can be improved to be ½ in the case of monochrome. Further, since the oblique color line can be avoided, it is possible to obtain the extremely excellent quality of a picture.

While in both the embodiments the display positions are changed-over by using the horizontal period delay circuit, alernatively, it is possible to switch the display positions by doubling the switching elements $M_{11}$ to $M_{nm}$ of the picture element electrodes that are displaced by ½ picture element pitch amount and by connecting them to the different gate lines $G_1$ to $G_n$.

While both in the above mentioned embodiments the electrodes are displaced every other one in the horizontal direction by ½ picture element pitch amount in the vertical direction, if they are displaced every other one in the vertical direction by ½ picture element pitch amount in the horizontal direction, it is possible to improve the quality of a picture similarly.

According to this invention as described above, since there are provided the displacements by ½ picture element pitch amount, it becomes possible to increase the vertical resolution and also to improve the quality of picture.

We claim:

1. In a liquid crystal display apparatus in which a plurality of first signal lines are provided parallel to one another and extend in the vertical direction, a plurality of second signal lines are provided parallel to one another and extend in the horizontal direction, picture element electrodes of display liquid crystal cells are respectively provided with a plurality of switching transistors at intersections where said first and second plurality of signal lines intersect with one another, a plurality of gate lines to which a control signal for controlling said switching transistors is supplied, said plurality of gate lines extending parallel to one another in the horizontal direction, said liquid crystal display apparatus being characterized in that said picture element electrodes are formed at every other one in the horizontal direction with a displacement of ½ picture element pitch distance in said vertical direction, wherein during one interlaced field, arbitrary picture element electrodes are aligned at every other one in the horizontal direction and picture element electrodes are located upwardly from the former with a displacement of ½ picture element pitch distance which constitute a horizontal line, while during the other interlaced field, said arbitrary picture element electrodes and picture element electrodes are located downwardly from the former with a displacement of ½ picture element pitch distance which constitutes a horizontal line to thereby carry out the display, and said gate lines are straight and extend in the horizontal direction.

* * * * *